(12) United States Patent
Raikin et al.

(10) Patent No.: US 9,648,081 B2
(45) Date of Patent: May 9, 2017

(54) NETWORK-ATTACHED MEMORY

(71) Applicant: Mellanox Technologies Ltd., Yokneam (IL)

(72) Inventors: Shlomo Raikin, Moshav Ofer (IL); Shachar Raindel, Haifa (IL); Michael Kagan, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 232 days.

(21) Appl. No.: 14/644,400

(22) Filed: Mar. 11, 2015

(65) Prior Publication Data

US 2015/0293881 A1 Oct. 15, 2015

Related U.S. Application Data

(60) Provisional application No. 61/977,655, filed on Apr. 10, 2014.

(51) Int. Cl.
| | |
|---|---|
| *G06F 15/167* | (2006.01) |
| *H04L 29/08* | (2006.01) |
| *G06F 12/1072* | (2016.01) |
| *G06F 15/173* | (2006.01) |

(52) U.S. Cl.
CPC .......... *H04L 67/02* (2013.01); *G06F 12/1072* (2013.01); *G06F 15/17331* (2013.01); *H04L 67/10* (2013.01)

(58) Field of Classification Search
USPC ......................................................... 709/212
See application file for complete search history.

(56) References Cited

U.S. PATENT DOCUMENTS

| | | |
|---|---|---|
| 7,756,943 B1 | 7/2010 | Wong |
| 7,971,236 B1 | 6/2011 | Lentini |
| 8,051,212 B2 | 11/2011 | Kagan et al. |
| 8,082,400 B1 | 12/2011 | Chang et al. |
| 8,266,238 B2 | 9/2012 | Zimmer et al. |
| 8,433,770 B2 | 4/2013 | Noya et al. |
| 8,917,595 B2 | 12/2014 | Shah et al. |

(Continued)

OTHER PUBLICATIONS

Liang et al., "Swapping to Remote Memory over InfiniBand: An Approach using a High Performance Network Block Device", IEEE International Conference on Cluster Computing (CLUSTER 2005), 10 pages, Sep. 2005.

(Continued)

*Primary Examiner* — Hee Soo Kim
(74) *Attorney, Agent, or Firm* — D. Kligler I.P. Services Ltd.

(57) ABSTRACT

A method for memory access is applied in a cluster of computers linked by a network. For a given computer, a respective physical memory range is defined including a local memory range within the local RAM of the given computer and a remote memory range allocated to the given compute within the local RAM of at least one other computer in the cluster, which is accessible via the network using the network interface controllers of the computers. When a memory operation is requested at a given address in the respective physical memory range, the operation is executed on the data in the local RAM of the given computer when the data at the given address are valid in the local memory range. Otherwise the data are fetched from the given address in the remote memory range to the local memory range before executing the operation on the data.

20 Claims, 4 Drawing Sheets

(56) References Cited

U.S. PATENT DOCUMENTS

| | | |
|---|---|---|
| 2004/0073716 A1 | 4/2004 | Boom et al. |
| 2005/0149817 A1 | 7/2005 | Biran et al. |
| 2007/0283054 A1 | 12/2007 | Burton |
| 2008/0013448 A1 | 1/2008 | Horie et al. |
| 2011/0029650 A1 | 2/2011 | Shah |
| 2011/0246597 A1 | 10/2011 | Swanson et al. |
| 2011/0295967 A1 | 12/2011 | Wang et al. |
| 2014/0089631 A1 | 3/2014 | King |
| 2014/0164545 A1 | 6/2014 | Davis et al. |
| 2014/0173154 A1 | 6/2014 | Sunkavalli et al. |
| 2015/0089009 A1 | 3/2015 | Tsirkin et al. |

OTHER PUBLICATIONS

Choi et al., "A Remote Memory System for High Performance Data Processing", International Journal of Future Computer and Communication, vol. 4, No. 1, pp. 50-54, Feb. 2015.

Liang et al., "Exploiting Remote Memory in InfiniBand Clusters using a High Performance Network Block Device (HPBD)", Technical Report OSU-CISRC-5/05-TR36, 11 pages, Jun. 13, 2005.

Redhat, "Overcommitting with KVM", Chapter 7, 3 pages, 2015 https://access.redhat.com/site/documentation/en-US/Red_Hat_Enterprise_Linux/6/html/Virtualization_Administration_Guide/chap-Virtualization-Tips_and_tricks-Overcommitting_with_KVM.html.

U.S. Appl. No. 14/033,470 Office Action dated Feb. 18, 2016.

Raikin et al., U.S. Appl. No. 14/608,252 dated Jan. 29, 2015.

Infiniband Trade Association, "InfiniBandTM Architecture Specification", vol. 1, Release 1.2.1, 1727 pages, Nov. 2007.

U.S. Appl. No. 14/672,397 Office Action dated Dec. 16, 2016.

NETWORK-ATTACHED MEMORY

CROSS-REFERENCE TO RELATED APPLICATIONS

This application claims the benefit of U.S. Provisional Patent Application 61/977,655, filed Apr. 10, 2014, which is incorporated herein by reference.

FIELD OF THE INVENTION

The present invention relates generally to computer systems, and specifically to sharing memory resources in clusters of computers.

BACKGROUND

In most computers, there is a strong affinity between the central processing unit (CPU) or units and the physical random access memory (RAM) that holds data currently in use by programs running on the computer. Typically, the RAM is located close to the CPUs, often on the same printed circuit board, and is connected to the CPUs by a dedicated infrastructure that ensures memory coherency and low latency. In this sort of system, the size of the memory available to the CPUs is limited to the amount of physical RAM that is actually present in the computer.

In contrast to this conventional model, memory sharing among computers in a cluster is becoming increasingly common in virtualized environments, such as data centers and cloud computing infrastructures. For example, U.S. Pat. No. 8,266,238 describes an apparatus including a physical memory configured to store data and a chipset configured to support a virtual machine monitor (VMM). The VMM is configured to map virtual memory addresses within a region of a virtual memory address space of a virtual machine to network addresses, to trap a memory read or write access made by a guest operating system, to determine that the memory read or write access occurs for a memory address that is greater than the range of physical memory addresses available on the physical memory of the apparatus, and to forward a data read or write request corresponding to the memory read or write access to a network device associated with the one of the plurality of network addresses corresponding to the one of the plurality of the virtual memory addresses.

As another example, U.S. Pat. No. 8,082,400 describes firmware for sharing a memory pool that includes at least one physical memory in at least one of plural computing nodes of a system. The firmware partitions the memory pool into memory spaces allocated to corresponding ones of at least some of the computing nodes, and maps portions of the at least one physical memory to the memory spaces. At least one of the memory spaces includes a physical memory portion from another one of the computing nodes.

SUMMARY

Embodiments of the present invention that are described hereinbelow provide methods and apparatus for memory access in a cluster of computers.

There is therefore provided, in accordance with an embodiment of the invention, a method for memory access in a cluster of computers linked by a network. Each of the computers includes a processor, a local random-access memory (RAM), and a network interface controller (NIC) connected to the network. The method includes defining for a given computer in the cluster a respective physical memory range including a local memory range within the local RAM of the given computer and a remote memory range allocated to the given compute within the local RAM of at least one other computer in the cluster. Upon receiving a request from the processor of the given computer to execute a memory operation on data at a given address in the respective physical memory range, the operation is executed on the data in the local RAM of the given computer when the data at the given address are valid in the local memory range. Otherwise, the data are fetched from the given address in the remote memory range to the local memory range before executing the operation on the data.

In some embodiments, fetching the data includes accessing the data in the remote memory range by performing a remote direct memory access (RDMA) operation by the NIC of the given computer over the network. In a disclosed embodiment, performing the RDMA operation includes decoding the given address to identify the at least one other computer where the remote memory range is located and a corresponding memory address on the at least one other computer where the data are located.

Typically, defining the respective physical memory range includes configuring at least a part of the local memory range as a cache of the remote memory range.

In some embodiments, a respective part of the local RAM in each of a plurality of the computers in the cluster is allocated for use as a remote memory range by others of the computers in the cluster. Additionally or alternatively, the computers include at least one memory server, and defining the respective physical memory range includes allocating respective remote memory ranges in the local RAM of the memory server to a plurality of the computers in the cluster. Respective remote memory ranges of different sizes may be to different computers in the cluster.

In a disclosed embodiment, defining the respective physical memory range includes operating a balloon driver on one or more of the computers in the cluster in order to free the local RAM in the one or more of the computers for allocation to respective remote memory ranges of other computers in the cluster. Additionally or alternatively, defining the respective physical memory range includes identifying duplicate data in respective remote memory ranges of two or more of the computers, and deduplicating the data by creating a single copy of the data to be shared by the two or more of the computers, and wherein fetching the data includes fetching the shared copy. Further additionally or alternatively, the method includes collectively assessing accesses by two or more of the computers to the respective remote memory ranges in order to select data from the remote memory ranges for eviction to a storage medium.

There is also provided, in accordance with an embodiment of the invention, computing apparatus, including a computer for deployment in a cluster of computers linked by a network. The computer includes a processor, a local random-access memory (RAM), and a network interface controller (NIC) connected to the network. A RAM cache controller in the apparatus is configured to receive a definition of a respective physical memory range including a local memory range within the local RAM of the computer and a remote memory range allocated to the given compute within the local RAM of at least one other computer in the cluster. The RAM cache controller is configured, upon receiving a request from the processor of the computer to execute a memory operation on data at a given address in the respective physical memory range, to execute the operation on the data in the local RAM of the computer when the data at the given address are valid in the local memory range, and otherwise to instruct the NIC to fetch the data from the given address in the remote memory range to the local memory range before executing the operation on the data.

The present invention will be more fully understood from the following detailed description of the embodiments thereof, taken together with the drawings in which:

DETAILED DESCRIPTION OF EMBODIMENTS

Overview

U.S. patent application Ser. No. 14/608,151, filed Jan. 29, 2015, which is assigned to the assignee of the present patent application and whose disclosure is incorporated herein by reference, describes a method for network access to remote memory directly from a local instruction stream using conventional loads and stores. The network is treated as yet another memory that can be directly read from, or written to, by the CPU, typically using remote direct memory access (RDMA) operations carried out by network interface controllers (NICs). The techniques described in this patent application are useful, for example, in scenarios in which a part of the system memory of a computer (such as RAM) resides over a network and is made accessible on demand to different CPUs.

Embodiments of the present invention that are described herein build on the sort of infrastructure described in U.S. patent application Ser. No. 14/608,151, while providing facilities that enable efficient management and exploitation of memory resources in a cluster of computers. Each such computer typically comprises at least one CPU, local RAM, and a NIC connected to a network, which links the computers in the cluster. In the description that follows and in the claims, the terms "CPU" and "processor" are used interchangeably, and a computer in a cluster may alternatively be referred to as a "host" or "computing node." The RAM typically comprises double data rate (DDR) synchronous dynamic RAM (SDRAM), but the memory sharing techniques described herein may alternatively be applied in managing and accessing other sorts of RAM. As will be illustrated in the description below, the computers in the cluster are not necessarily homogeneous in terms of memory configuration, and may comprise, for example, one or more memory blades or other servers having large volumes of RAM that can be accessed by other computers in the cluster.

In some embodiments, computers in the cluster use a caching scheme to handle their local and remote memory resources. For this purpose, the physical memory range for any given computer in the cluster (or at least some of the computers) is defined as comprising a local memory range within the local RAM of the given computer and a remote memory range allocated to the given compute within the local RAM of at least one other computer in the cluster. Typically, multiple computers in the cluster have respective physical memory ranges that are defined in this manner. Memory access operations are handled by a novel hardware component in each computer, which is referred to herein as a RAM cache controller.

Upon receiving a request from the processor of a computer to execute a memory operation, such as "load" or "store," on data at a given address in the respective physical memory range, the RAM cache controller determines whether the data at the given address are valid in the local memory range, and if so executes the operation on the data in the local RAM. Otherwise, the RAM cache controller fetches the data from the given address in the remote memory range to the local memory range before executing the desired operation on the data. Typically, the RAM cache controller copies the data between the local and remote memory ranges in such a way as to ensure that coherency is maintained between the local and remote memory ranges.

In the disclosed embodiments, the RAM cache controller accesses the data in the remote memory range by instructing the NIC to read from or write to the memory of the target computer over the network by RDMA. Although this sort of remote memory access is much slower than access to the local memory range of the computer, RDMA over a high-speed network with suitable NICs, such as in an InfiniBand (IB) or Data Center Ethernet (DCE) infrastructure, is still far faster than access to a disk or other storage memory. The RAM cache controller may apply a pre-fetching strategy in order to anticipate data requests and thus reduce memory access latency.

Treating at least a part of the local RAM as a cache with respect to a larger, remote RAM in the cluster is advantageous not only in terms of memory access speed, but also in enhancing the overall management of memory resources in the cluster. For example, when a large repository of remote RAM is shared by multiple computers, it can be overprovisioned in a manner similar to overprovisioning of virtual memory within a single computer. The RAM repository can also be backed up regularly, for enhanced system reliability, and supports fast migration of virtual machines from one host to another, since the virtual machine images are already present in the RAM repository before migration is invoked. The RAM cache controllers (or other management entity) may cooperatively apply deduplication in order to free memory pages that contain duplicate data.

System Description

Figure 1:
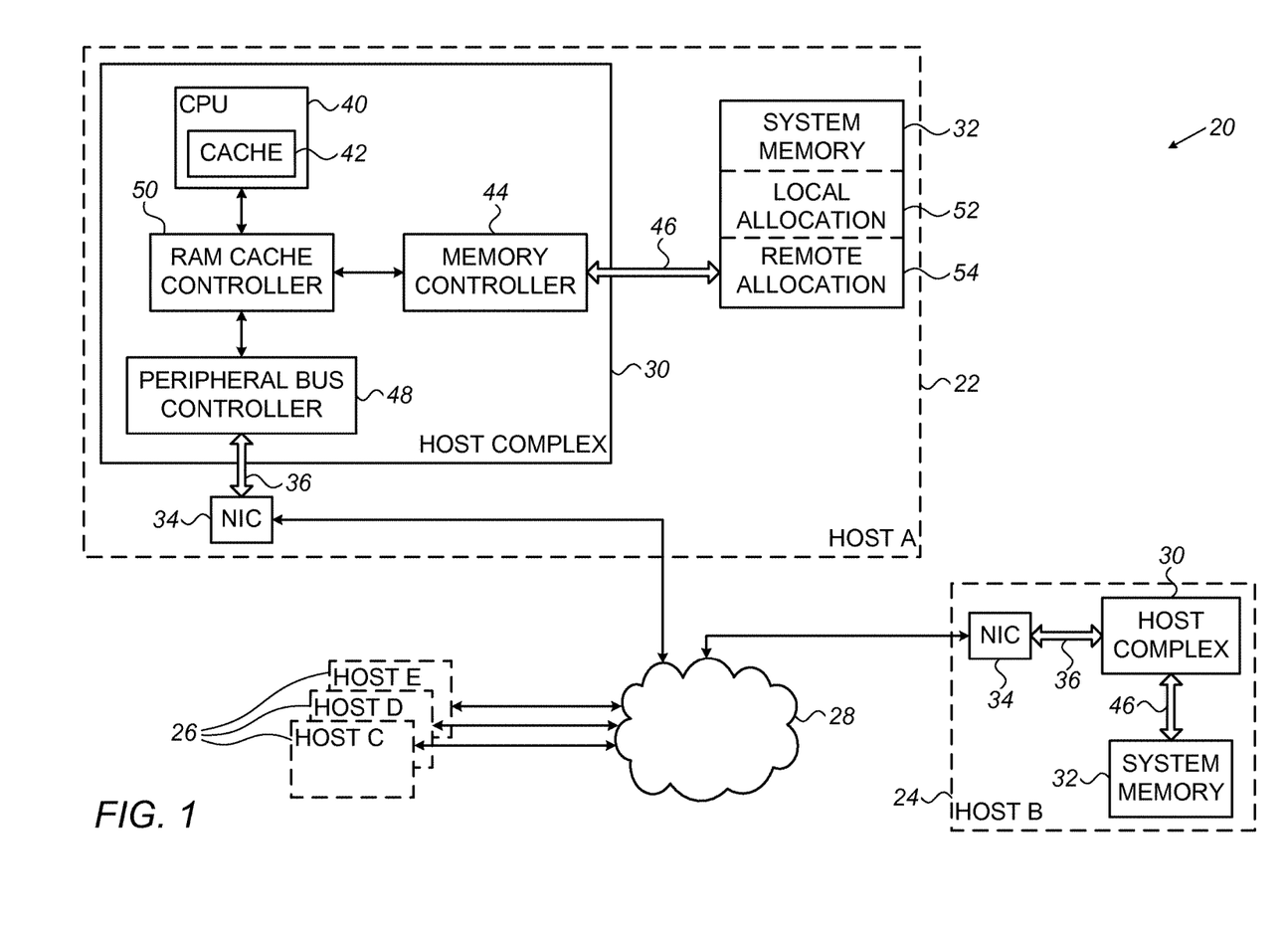
FIG. 1 is block diagram that schematically illustrates a cluster of computers, in accordance with an embodiment of the present invention.

FIG. 1 is block diagram that schematically illustrates a cluster 20 of computers 22, 24, 26, . . . , in accordance with an embodiment of the present invention. The computers (referred to in the figure as "hosts") are interconnected by a packet network 28, typically a switch fabric such as an IB or DCE network, which supports RDMA operations between the computers.

As exemplified by computer 22 (HOST A), each of the computers comprises a host complex 30, which is connected to a system memory 32 by a memory bus 46 and to a NIC 34 by a peripheral component bus 36, such as a PCI Express® bus. Host complex 30 typically comprises a single chip or a suitable chipset. Although NIC 34 is illustrated in FIG. 1, for the sake of conceptual clarity, as a separate component from host complex 30, the NIC may alternatively be integrated in the host complex chip or chip set. Computers 22, 24, 26, . . . , may be of any suitable type, such as blade or rack servers, as well as separate, freestanding machines.

System memory 32 typically comprises physical memory in the form of RAM, such as DDR SDRAM. At least a part of memory 32, or possibly all of the memory, is defined as a local allocation 52, meaning that it is used by programs running on host complex 30 as a local RAM. In at least some of computers 22, 24, 26, another part of memory 32 is available as a remote allocation 54, for use as remote RAM by other computers in cluster 20, using the RDMA-based access techniques that are described herein. In the pictured embodiments, local allocation 52 and remote allocation 54 are treated as logical partitions in the same bank or banks of system memory 32. This approach is advantageous in that it enables the sizes and bounds of the allocations to be adjusted in response to changing system requirements. Alternatively or additionally, at least parts of the local and remote allocations may be configured as separate banks of physical memory.

Host complex 30 typically comprises at least one general-purpose CPU 40 and associated control components. These latter components include a memory controller 44, which provides access to and refreshes memory 32 via bus 46, and a peripheral bus controller 48, which communicates with input/output (I/O) devices, such as NIC 34, and other peripheral components over bus 36. Although only a single CPU 40 is shown in the figure, the host complex typically comprises multiple CPU cores, with a suitable internal cache 42. This internal cache may likewise be divided among the cores and organized in two or more levels, for example, an L1 cache connected to each core and an L2 cache shared among the cores, as is known in the art. For the sake of simplicity in the description that follows, however, cache 42 is treated as a single entity, and a cache miss in cache 42 means that the data required by the CPU for a given memory operation was not present in the lowest level of the cache.

In the event of a cache miss in cache 42, CPU 40 submits a memory access request to a RAM cache controller 50, which manages both local allocation 52 in the local memory 32 of computer 22 and remote allocations 54 assigned to computer 22 in other computers 24, 26, . . . , in cluster 20. Controller 50 typically treats local allocation 52 as a further cache level within a larger range of physical memory that is provided by the remote allocation(s). In other words, upon receiving a request from CPU 40 to access data at a certain address in RAM, controller 50 provides the data from local allocation 52 if the address is valid in the local allocation, and otherwise invokes an RDMA operation by NIC 34 to access the data via network 28 in the appropriate remote allocation. This method of data access is described further with reference to FIG. 2.

In order to implement efficiently this sort of memory access arrangement, RAM cache controller 50 and NIC 34 typically use the sort of extended memory addressing scheme that is described in the above-mentioned U.S. patent application Ser. No. 14/608,151. In this scheme, a part of the physical addressing range of the memory is assigned to NIC 34 on bus 36, and certain bits of the memory address are used to encode network addresses on network 28 at which the corresponding remote memory allocations are located. NIC 34 comprises logic that decodes these address bits and automatically issues RDMA read or write commands to the appropriate network addresses, corresponding to the memory load and store commands issued to the addresses by RAM cache controller 50. In this manner, the RDMA capability of NIC 34 and network 28 is used to provide rapid memory access while circumventing the need for software-generated work items in invoking these RDMA operations.

RAM cache controller 50 may apply any suitable sort of cache management scheme in transferring data between local allocation 52 and remote allocations 54 in other computers. For example, the scheme may be strictly inclusive (meaning that the remote allocations hold copies of all addresses in the local allocation), strictly exclusive (so that no address resides in both local and remote allocations), or somewhere in between. Controller 50 may configure local allocation 52 as a direct-mapped or way-associative cache, or may use any other suitable cache configuration that is known in the art. The granularity of the caching in local allocation 52 may also be adjusted and set to any desired size, so that each cache tag may access a segment of 2 KB, 4 KB, or larger or smaller sizes. (These cache segments are referred to herein as "extended lines," to distinguish them from the size of cache lines in cache 42, which is typically, although not necessarily, smaller.)

For low latency, the functions of RAM cache controller 50 are typically implemented in hardware logic. Alternatively or additionally, some or all of the functions of the RAM cache controller may be implemented in software, using existing memory management hardware in host complex 30 to identify cache misses in local allocation 52. In this case, the cache segment size will typically be a single page for compatibility with the existing hardware.

Computer-readable program instructions for carrying out the functions of the RAM cache controller, as well as for the memory allocation and management functions that are described hereinbelow, may be downloaded in electronic form to computers 22, 24, 26, . . . , over network 28, for example, for execution by CPUs 40 or other programmable components within the computers. Additionally or alternatively, the instructions may be stored in tangible, non-transitory computer-readable media, such as magnetic, optical, or electronic memory media.

Memory Access Operations

Figure 2:
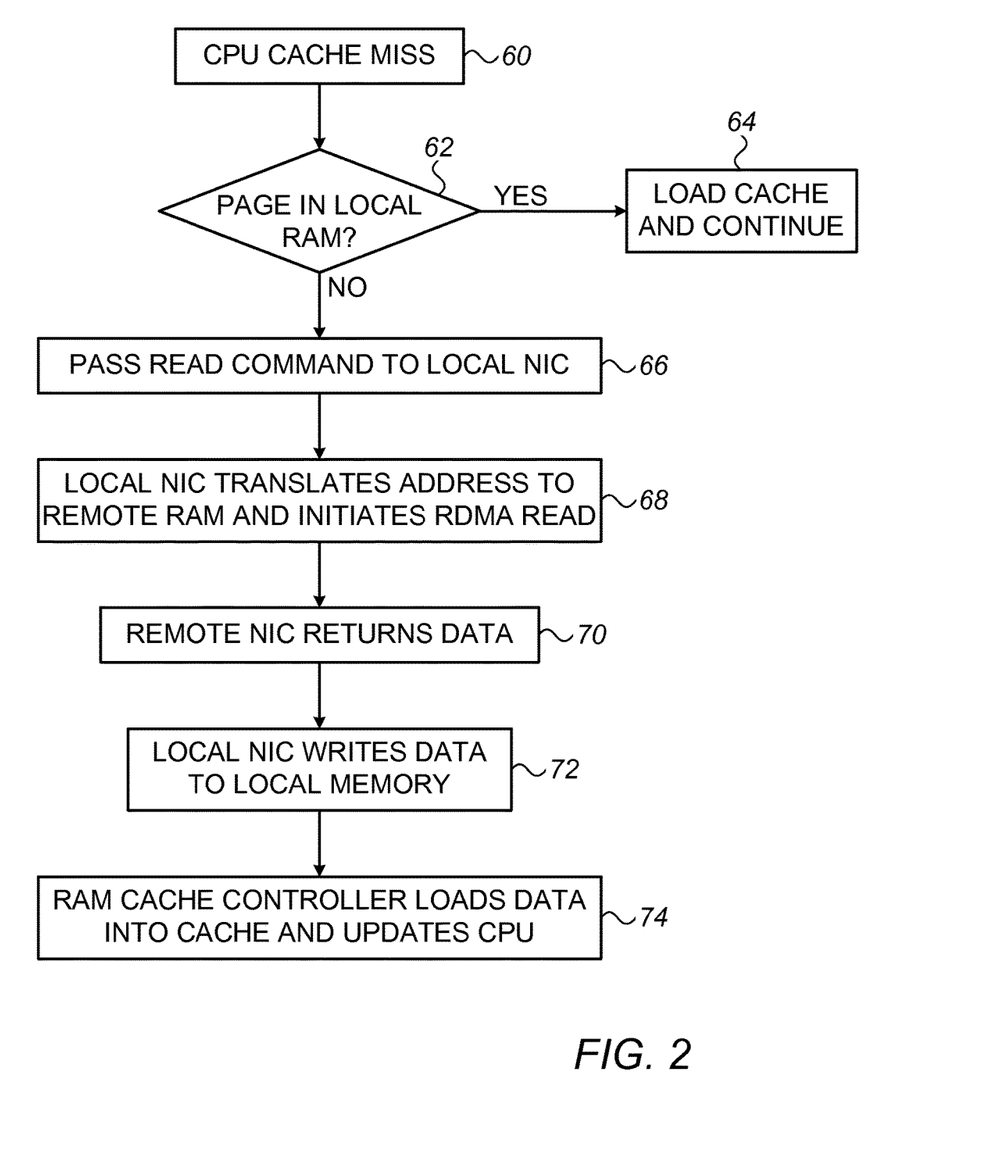
FIG. 2 is a flow chart that schematically illustrates a method for memory access in a computer in a cluster, in accordance with an embodiment of the present invention.

FIG. 2 is a flow chart that schematically illustrates a method for memory access in cluster 20, in accordance with an embodiment of the present invention. The method is described by way of example with reference to a memory read (load) operation performed by the elements of computer 22. It is initiated when CPU 40 encounters a last-level cache miss in cache 42, at a cache miss step 60. At this point, the CPU submits a request to RAM cache controller 50 to fetch the missing cache line from the system memory.

Controller 50 checks whether the page containing the requested cache line is valid in local allocation 52 in memory 32, at a cache checking step 62. If so, controller 50 fetches the requested data from memory 32 and loads the data into cache 42 in the conventional way, at a cache hit step 64.

Otherwise, controller 50 passes the read command to NIC 34, at a read request step 66. The read command typically has the form of a load instruction that is directed to an extended memory address, which encodes the location of the desired remote memory allocation on network 28, as described above. NIC 34 decodes the extended memory address to identify the network node where the remote memory allocation is located and the appropriate memory address on that node (which may be a virtual address) that contains the desired data, at a NIC activation step 68. To retrieve the data, NIC 34 sends an RDMA read request on the appropriate transport channel to the remote node, specifying the target address from which the data should be read. Optionally, to reduce latency, controller 50 may instruct NIC 34 first to read only the cache line requested by CPU 40, followed afterwards by a read request for the complete extended line.

Upon receiving the RDMA read request, the NIC on the remote node reads the requested data from the local memory of that node and returns the data in an RDMA read response via network 28, at a read response step 70. Upon receiving the read response, NIC 34 of computer 22 writes the data to the appropriate address in local allocation 52 in memory 32, at a data writing step 72. NIC 34 informs RAM cache controller 50 that the data are available, whereupon controller 50 loads the data into cache 42 and updates CPU 40, at a cache loading step 74. Alternatively or additionally, NIC 34 may deliver the incoming data directly to controller 50, which then loads the data into cache 42 immediately.

To reduce latency in responding to memory instructions from CPU 40, RAM cache controller 50 may apply a pre-fetching strategy to load data into local allocation 52 before the data are actually requested by CPU 40. Thus, for example, after CPU 40 requests a particular cache line at step 60, and controller 50 passes a corresponding load command to NIC 34 at step 66, the controller 50 may follow this load command with further read requests to NIC 34 for extended lines in the remote memory allocation that follow (in address order, for example) the extended line containing the requested cache line. Controller 50 and NIC 34 will thus carry out RDMA operations and load data that have not yet been requested by CPU 40 into local allocation 52 in memory 32.

When CPU 40 encounters a cache miss on a store operation, RAM cache controller 50 similarly checks whether the desired physical address is valid in local allocation 52 in memory 32, and if so writes the data to the local allocation. Otherwise, controller 50 may invoke an RDMA write operation by NIC 34 directly to the remote memory allocation on the appropriate node via network 28. Alternatively, controller 50 may allocate space in local allocation 52, invoke an RDMA read request to retrieve the required extended line from the remote memory allocation via the network, and then when NIC 34 delivers the extended line, merge the data written by the CPU into the retrieved data and save the merged data in local allocation 52.

In general, programs running on CPU 40 tend to be more sensitive to latency of read operations than of writes. It is therefore desirable that in communications sent by RAM cache controller 50 to NIC 34 via peripheral component bus 36, read requests be allowed to bypass previous writes. This behavior is opposite, however, to the model enforced on buses such as the PCI Express bus, where write requests are given priority over reads.

In an embodiment of the present invention, in order to ensure that read requests to NIC 34 receive priority over writes, and thus to reduce read latency, RAM cache controller 50 uses different virtual channels (VCs) on bus 36 for read and write requests, with higher priority assigned to the read channel than to the write channel. In order to maintain same-address memory ordering, however, it is still desirable to ensure that a read operation will not bypass a write that is directed to the same address. For this reason, before evicting an entry from local allocation 52 to a remote allocation on another node, controller 50 will first send a write request to NIC 34 to write the entry back to the appropriate address in the remote allocation. Controller 50 will wait to invalidate (and overwrite) the entry in local allocation 52 until it has received an acknowledgment from NIC 34 that the write-back operation to the remote allocation has been completed. Until that time, controller 50 will respond to CPU read requests directed to the address in question in local allocation 52 by returning the existing local data.

Memory Sharing Configurations

Figure 3:
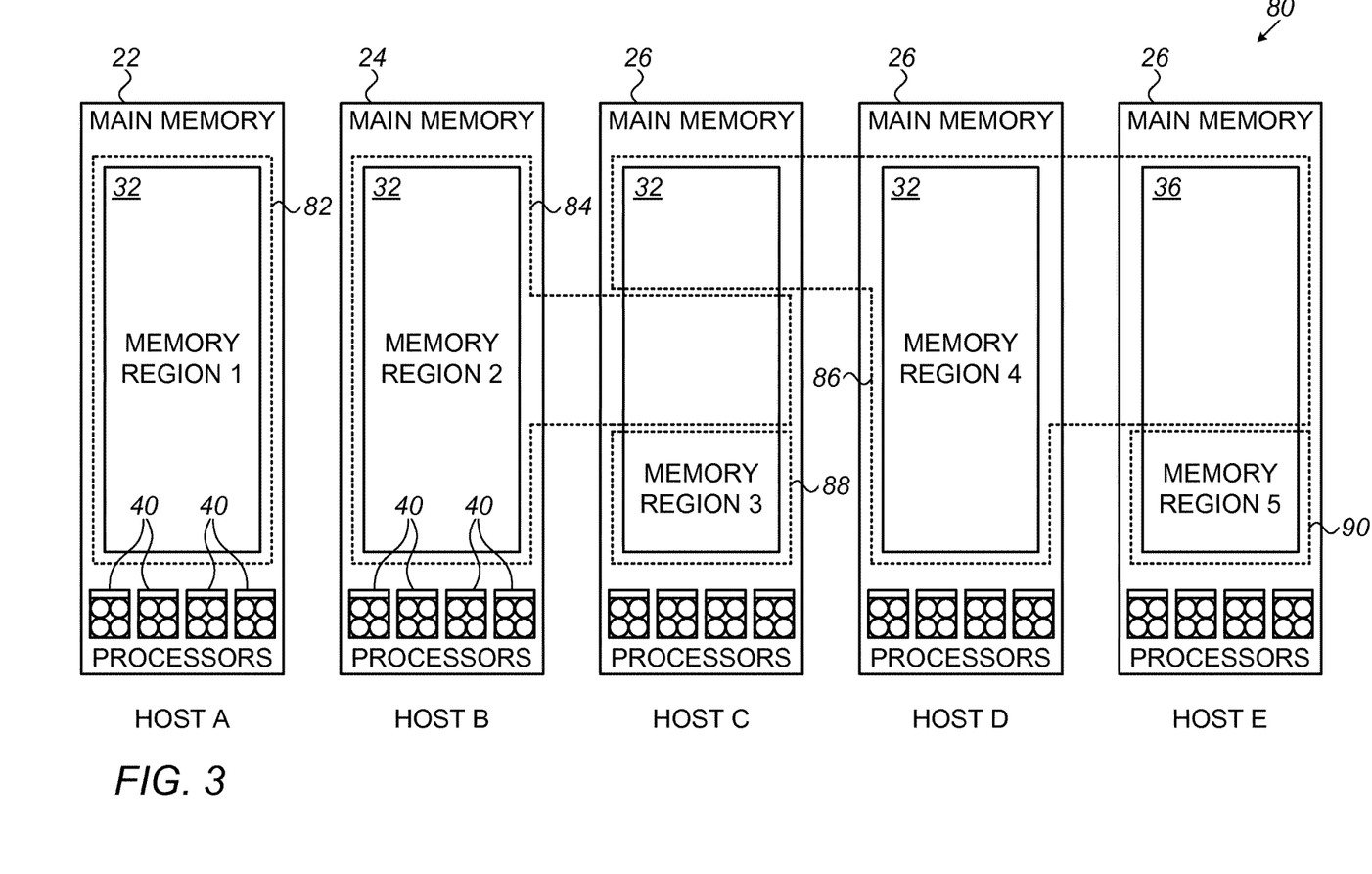
FIG. 3 is block diagram that schematically illustrates allocation of memory in a cluster of computers, in accordance with an embodiment of the present invention.

FIG. 3 is block diagram that schematically illustrates allocation of memory 32 in a cluster 80 of computers 22, 24, 26, . . . , in accordance with an embodiment of the present invention. The computers in this example (which are labeled as HOST A through HOST E) each comprise multiple CPUs 40 (identified in this figure as "PROCESSORS") and system memory 32. The computers are interconnected by a network, such as network 28 (not shown in this figure). The physical resources of computers 22, 24, 26 in this embodiment are configured symmetrically, in the sense that each of the computers has roughly the same amount of physical memory on board.

In terms of actual memory availability, however, the memory resources are exploited non-symmetrically, with different memory regions 82, 84, 86, 88, 90 assigned to processors 40 in the different computers. For computers (HOSTS A, C and E), the corresponding memory regions 82, 88 and 90 are restricted to all or a part of the local system memory 32 in each of the computers. On the other hand, memory region 84 of computer 24 (HOST B) includes a remote allocation on HOST C, while memory region 86 of HOST D includes remote allocations on HOSTS C and D. The sizes of these remote allocations are not necessarily fixed and may change dynamically in response to the needs of programs running on the different computers.

Figure 4:
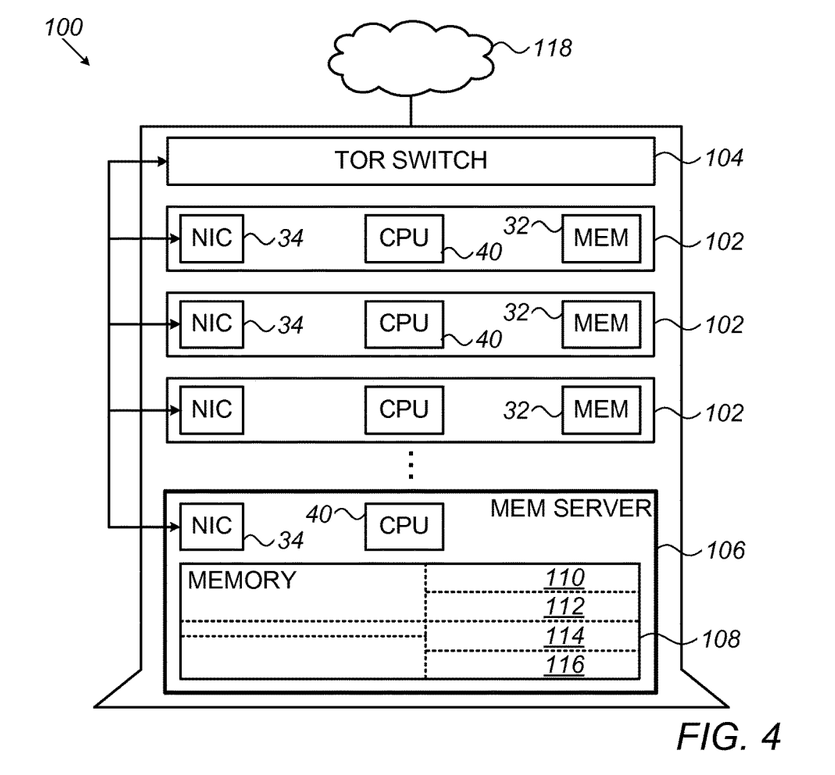
FIG. 4 is block diagram that schematically illustrates allocation of memory in a cluster of computers, in accordance with another embodiment of the present invention.

FIG. 4 is block diagram that schematically illustrates allocation of memory in a cluster 100 of computers 102, 106, in accordance with another embodiment of the present invention. In this example, computers 102 are rack-mounted servers, each with a limited amount of local memory 32, along with a memory server 106 with a large repository of memory 108 that is available to servers 102 as respective remote allocations. A top-of-rack (TOR) switch 104 provides the network link over which NICs 34 communicate, including carrying out RDMA operations for access to remote memory allocations as described above.

A memory management function in cluster 100 assigns respective remote allocations 110, 112, 114, 116, . . . , in memory 108 of server 106 to computers 102. This function (illustrated explicitly in FIG. 5) may run on one of the computers in the cluster, for example on CPU 40 of memory server 106, or it may be distributed over several or all of the computers. As shown in FIG. 4, allocations 110, 112, 114, 116, . . . , are typically not equal in size, but are rather assigned to computers 102 according to memory needs and may vary in size dynamically over time. As described above, RAM cache controller 50 (FIG. 1) in each of computers 102 treats its local memory 32 as a cache with respect to its respective remote allocation in memory 108, which it accesses by RDMA operations carried out by NICs 34.

Figure 5:
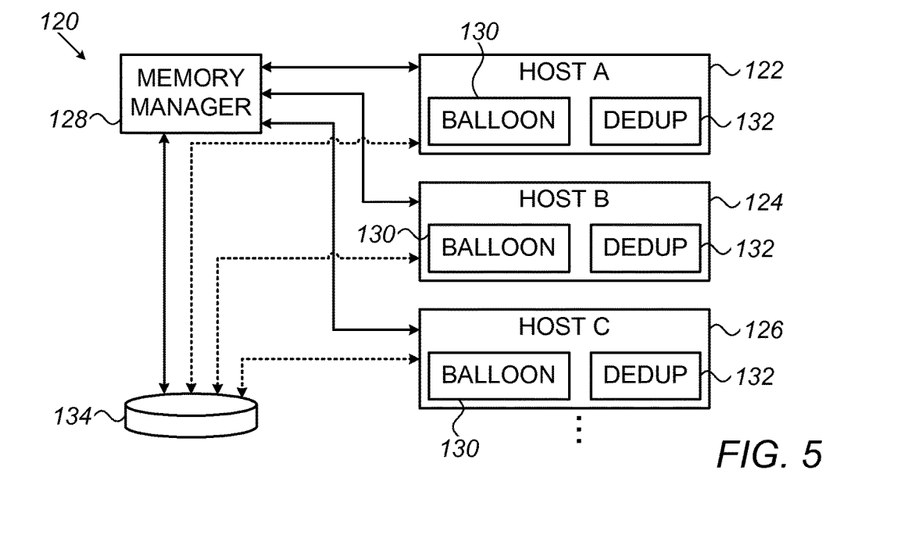
FIG. 5 is a block diagram that schematically illustrates hardware and software components used in management of memory in a cluster of computers, in accordance with an embodiment of the present invention.

FIG. 5 is a block diagram that schematically illustrates hardware and software components used in management of memory in a cluster 120 of computers 122, 124, 126, in accordance with an embodiment of the present invention. As illustrated in the previous figures, each of the computers has physical RAM that includes a local memory allocation. In at least one of the computers (and possibly more), physical RAM is made available to other computers in the cluster as remote allocations, accessed by RDMA, as described above. A memory manager 128, running in software on one or more of the computers, manages the remote memory allocations.

In each of computers 122, 124, 126, . . . , the operating system exposes a large range of physical memory to application programs running on the computer. In contrast to conventional systems, however, only a part of the physical memory (typically a small part) is actually located in the computer itself, while the remainder is distributed in one or more remote allocations on another computer or computers in the cluster. As illustrated in the preceding figures, a single computer, such as memory server 106, may provide remote allocations to multiple clients. At any given time, however, it is likely that not all of the clients will require all of the physical memory in their remote allocation. Therefore, it is possible to overprovision the remote allocations, so that, for example, the total volume of remote allocations 110, 112, 114, 116, . . . , in memory 108 of server 106 exceeds the actual volume of physical memory that is available.

Manager 128 dynamically enlarges and shrinks the remote memory allocations of computers 122, 124, 126, . . . , according to current memory needs on each computer. For this purpose, a balloon driver program 130 may be installed on some or all of the computers, typically at the level of the operating system or the hypervisor (in the case of virtualized systems). The task of the balloon driver is to reclaim system memory that is not currently required by applications running on the computers and thus to free RAM in the computers for allocation to the respective remote memory ranges of other computers in the cluster. Because memory that is mapped to the balloons is never actually accessed by an application or operating system program running on any of the computers, there is no need to physically populate the memory locations within any given balloon. The combined size of all the balloons can therefore exceed the volume of physical memory available, thus supporting the overprovisioning strategy described above.

Memory manager 128 communicates with balloon driver programs 130 to track the memory pressure experienced by the respective operating systems or hypervisors (in terms of the amount of free memory that can be claimed by the balloon driver in comparison with the amount demanded by applications running on each computer). When memory manager 128 detects high pressure, the memory "balloons" held by some or all of the balloon driver programs are "deflated" in order to make memory available to other programs. When low memory pressure is detected, the balloons are inflated in order to reclaim memory for other remote allocations. Memory manager 128 may also monitor the size of the available pool of memory that is free for remote allocation, and may instruct balloon driver programs 130 to inflate their balloons when the amount of unallocated memory in the pool drops below a certain threshold level.

Optionally, when the amount of unallocated memory available for remote RAM allocation drops below a threshold level, memory manager 128 may move some of the extended lines stored in the remote allocations to a slower storage medium 134, such as a non-volatile memory (for example, a magnetic disk, solid-state drive, or phase change memory) or a compressed repository. Manager 128 may use any suitable criteria in selecting the extended lines to evict to storage medium 134, taking into account, however, the importance of making the data available promptly when it is again requested by one of the CPUs. Typically, the selection criteria are applied collectively over the remote memory allocations of multiple computers in the cluster. For example, memory manager 128 may apply a least-recently-used approximation scheme to choose the extended lines to evict based on monitoring of read and write accesses over at least a group of the computers in the cluster to their respective remote memory allocations. In this context, the "second chance" page replacement algorithm used in the Linux® kernel may be adapted, mutatis mutandis, for use by memory manager 128. Centralization of memory swapping to storage medium 134 by the memory manager will generally reduce the overall need for swapping to storage in the cluster and enhance the overall efficiency of eviction decisions.

Additionally or alternatively, computers 122, 124, 126, . . . , holding remote memory allocations may run a deduplication program 132, coordinated by memory manager 128, in order to increase the availability of memory for remote allocation. Program 132 detects identical or nearly-identical extended lines in the remote memory pool (for example, in allocations 110, 112, 114, 116, . . . , in memory 108) and merges them into a single, read-only copy. In contrast to existing deduplication techniques, which typically perform deduplication only within a single computer, deduplication program 132 operates over the remote memory allocations of multiple computers in cluster 120 and is thus able to identify and combine larger numbers of duplicated memory pages.

To enable all client computers to access the shared, read-only copy of a deduplicated page, deduplication program 132 typically writes an address translation entry to a metadata structure, which is accessed by NIC 34 in order to translate memory access requests from the clients into the actual address of the merged copy. When two or more extended lines are found to be nearly identical, the metadata structure may also include the compressed binary difference between each target extended line and the read-only copy. NIC 34 or manager 128 will use the record of the differences in reconstructing the target extended line when requested by a client.

If any of the client computers submits a request to write data to an extended line that has been deduplicated, manager 128 allocates a new area in the remote allocation assigned to the requesting computer to store the rewritten extended line and updates the corresponding entry in the metadata structure accordingly. Manager 128 may keep a count of the number of computers sharing each deduplicated extended line and may then restore the extended line to normal, unshared (read/write) status when the count drops to one.

The deduplication function in cluster 120 may be carried out centrally by memory manager 128, or as illustrated in FIG. 5, deduplication program 132 may be distributed over multiple computers 122, 124, 126, . . . . For distributed operation, the various instances of program 132 may use a hash of the content of each extended line in selecting the memory region or machine in which each shared extended line is held. To handle client requests to write data to deduplicated extended lines, memory manager 128 typically keeps a pool of memory available and may invoke balloon driver programs 130 to inflate their respective balloons in order to free memory when the write pool drops below a threshold level.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for memory access, comprising:
in a cluster of computers linked by a network, each of the computers comprising a processor, a local random-access memory (RAM), and a network interface controller (NIC) connected to the network, defining for a given computer in the cluster a respective physical memory range comprising a local memory range within the local RAM of the given computer and a remote memory range allocated to the given compute within the local RAM of at least one other computer in the cluster; and
upon receiving a request from the processor of the given computer to execute a memory operation on data at a given address in the respective physical memory range, executing the operation on the data in the local RAM of the given computer when the given address is valid in the local memory range, and otherwise fetching the data from the given address in the remote memory range to the local memory range before executing the operation on the data.

2. The method according to claim 1, wherein fetching the data comprises accessing the data in the remote memory range by performing a remote direct memory access (RDMA) operation by the NIC of the given computer over the network.

3. The method according to claim 2, wherein performing the RDMA operation comprises decoding the given address to identify the at least one other computer where the remote memory range is located and a corresponding memory address on the at least one other computer where the data are located.

4. The method according to claim 1, wherein defining the respective physical memory range comprises configuring at least a part of the local memory range as a cache of the remote memory range.

5. The method according to claim 1, wherein a respective part of the local RAM in each of a plurality of the computers in the cluster is allocated for use as a remote memory range by others of the computers in the cluster.

6. The method according to claim 1, wherein the computers comprise at least one memory server, and wherein defining the respective physical memory range comprises allocating respective remote memory ranges in the local RAM of the memory server to a plurality of the computers in the cluster.

7. The method according to claim 1, wherein defining the respective physical memory range comprises allocating respective remote memory ranges of different sizes to different computers in the cluster.

8. The method according to claim 1, wherein defining the respective physical memory range comprises operating a balloon driver on one or more of the computers in the cluster in order to free the local RAM in the one or more of the computers for allocation to respective remote memory ranges of other computers in the cluster.

9. The method according to claim 1, wherein defining the respective physical memory range comprises identifying duplicate data in respective remote memory ranges of two or more of the computers, and deduplicating the data by creating a single copy of the data to be shared by the two or more of the computers, and wherein fetching the data comprises fetching the shared copy.

10. The method according to claim 1, and comprising collectively assessing accesses by two or more of the computers to the respective remote memory ranges in order to select data from the remote memory ranges for eviction to a storage medium.

11. Computing apparatus, comprising a computer for deployment in a cluster of computers linked by a network, the computer comprising:
a processor;
a local random-access memory (RAM);
a network interface controller (NIC) connected to the network; and
a RAM cache controller, which is configured to receive a definition of a respective physical memory range comprising a local memory range within the local RAM of the computer and a remote memory range allocated to the given compute within the local RAM of at least one other computer in the cluster,
wherein the RAM cache controller is configured, upon receiving a request from the processor of the computer to execute a memory operation on data at a given address in the respective physical memory range, to execute the operation on the data in the local RAM of the computer when the given address is valid in the local memory range, and otherwise to instruct the NIC to fetch the data from the given address in the remote memory range to the local memory range before executing the operation on the data.

12. The apparatus according to claim 11, wherein the NIC is configured to access the data in the remote memory range by performing a remote direct memory access (RDMA) operation over the network.

13. The apparatus according to claim 12, wherein the NIC is configured to decode the given address in order to identify the at least one other computer where the remote memory range is located and a corresponding memory address on the at least one other computer where the data are located, and to direct the RDMA operation to the corresponding memory address on the at least one other computer.

14. The apparatus according to claim 11, wherein at least a part of the local memory range is configured as a cache of the remote memory range.

15. The apparatus according to claim 11, wherein a respective part of the local RAM in each of a plurality of the computers in the cluster is allocated for use as a remote memory range by others of the computers in the cluster.

16. The apparatus according to claim 11, wherein the computers comprise at least one memory server, and wherein respective remote memory ranges in the local RAM of the memory server are allocated to a plurality of the computers in the cluster.

17. The apparatus according to claim 11, wherein respective remote memory ranges of different sizes are allocated to different computers in the cluster.

18. The apparatus according to claim 11, wherein one or more of the computers in the cluster are configured to run a balloon driver in order to free the local RAM in the one or more of the computers for allocation to respective remote memory ranges of other computers in the cluster.

19. The apparatus according to claim 11, wherein the computer is configured to identify duplicate data in respective remote memory ranges of two or more of the computers, and to deduplicate the data by creating a single copy of the data to be shared by the two or more of the computers, wherein the NIC is configured to fetch the shared copy.

20. The apparatus according to claim 11, at least one of the computers in the cluster is configured to collectively assessing accesses by two or more of the computers to respective remote memory ranges of the computers in order to select data from the remote memory ranges for eviction to a storage medium.

* * * * *